United States Patent [19]

Erth

[11] 4,182,137
[45] Jan. 8, 1980

[54] LIQUID COOLING SYSTEM FOR HERMETICALLY SEALED ELECTRIC MOTOR

[75] Inventor: Richard A. Erth, York, Pa.

[73] Assignee: Borg-Warner Corporation, Chicago, Ill.

[21] Appl. No.: 866,428

[22] Filed: Jan. 3, 1978

[51] Int. Cl.² ............................................. F25B 31/00
[52] U.S. Cl. ......................................... 62/505; 310/61
[58] Field of Search ........................ 62/505; 310/54, 61

[56] References Cited

U.S. PATENT DOCUMENTS

| 2,891,391 | 6/1959 | Kocher et al. | 62/505 |
| 3,217,193 | 11/1965 | Rayner | 62/505 |
| 3,388,559 | 6/1968 | Johnson | 62/505 |
| 3,422,635 | 1/1969 | Trenkowitz | 62/505 |
| 3,805,547 | 4/1974 | Eber | 62/505 |

Primary Examiner—Ronald C. Capossela
Attorney, Agent, or Firm—James J. Jennings, Jr.

[57] ABSTRACT

A cooling system having an electric drive motor utilizes a portion of the sub-cooled liquid which would otherwise be passed from the condenser through an expansion device to the evaporator to cool the motor. The rotor cooling passage which extends longitudinally through the outer portion of the rotor has its outermost surface (that is, the surface farthest removed from the center of the motor) shaped in an arc having the same center as the center of the rotor. This ensures even distribution of the cooling liquid under the high centrifugal forces developed during motor operation. The stator has a passage from its outside surface inwardly to the longitudinal cooling portion of the stator. The inwardly extending passage includes an orifice, sufficiently large to prevent contamination problems but of an appropriate size to ensure good throttling and thus provide good heat transfer. The cross-sectional areas of the cooling passages are sized to minimize the velocity of the generated vapor.

10 Claims, 3 Drawing Figures

LIQUID COOLING SYSTEM FOR HERMETICALLY SEALED ELECTRIC MOTOR

BACKGROUND OF THE INVENTION

The present invention is particularly useful with cooling systems in which an electric motor is connected to drive a compressor or turbine which compresses a refrigerant gas. In general gas is taken from an evaporator, compressed to a high pressure, and then passed to a condenser. The sub-cooled refrigerant liquid from the condenser is then returned through an expansion device to the evaporator. It has been known in the art to divert some of the refrigerant from the condenser to cool the electric motor. This allows an electric motor of given rating to be more compact, or produce more output mechanical power, without damaging the electric windings or the insulation.

In the rotor cooling a longitudinal passage has been provided near the outer portion of the rotor. However frequently a "burn-out" phenomenon has been encountered wherein the liquid in the cooling passage actually is vaporized, and the heat transfer (and thus the cooling) is substantially degraded.

It is therefore a principal object of the present invention to provide a cooling passage through the rotor which virtually obviates burn-out as contrasted to prior art arrangements of comparable dimensions.

In the stator cooling, it has been common practice to allow the refrigerant liquid to enter the stator through a radial passage, and then be distributed longitudinally along the stator length. However this arrangement has not proved sufficiently efficacious in achieving the desired level of stator cooling.

It is therefore another principal object of the invention to provide a stator cooling arrangement in which the effective heat transfer is substantially increased, to provide a corresponding increase in the cooling efficiency.

SUMMARY OF THE INVENTION

The present invention is useful with a cooling system having a compressor, a condenser, and an evaporator, all connected in a closed refrigeration circuit. A hermetically sealed electric motor, having a rotor affixed to a shaft and having a stator, is connected to drive the compressor. The stator defines a first cooling passage extending radially inwardly and then longitudinally. The shaft and rotor define a second cooling passage extending longitudinally through the shaft, radially outwardly into the rotor and then longitudinally through the rotor. Means is provided for diverting a portion of the refrigerant from the condenser to both the first and the second cooling passages, and means is also provided for collecting the diverted refrigerant and returning it to the evaporator.

In accordance with an important aspect of the invention, the portion of the first cooling passage which extends radially inwardly in the stator, develops a pressure drop higher than that developed in the longitudinally extending portion of the first cooling passage.

In accordance with another important aspect of the invention, the portion of the second cooling passage which extends longitudinally through the rotor has its surface farthest removed from the shaft center curved in an arc which has as its center the center of the rotor shaft.

THE DRAWING

In the several figures of the drawing like reference numerals identify like components, and in that drawing:

FIG. 1 is a block diagram of a cooling system intercoupled with a hermetically sealed motor with first and second cooling passages; and FIGS. 2 and 3 are detail illustrations useful in understanding the physical construction of the stator and rotor cooling passages.

GENERAL SYSTEM DESCRIPTION

FIG. 1 depicts a cooling system in which a compressor 10, a condensor 11, and an evaporator 12 are all connected in a closed refrigeration circuit. Refrigerant gas is passed from the evaporator 12 through line 13 to the compressor, and the liquified refrigerant is passed from the compressor through line 14 to the condenser. The sub-cooled liquid refrigerant from the condenser is passed through lines 15 and 16, an expansion device 17, and another return line 18 back to the evaporator.

An electric motor 20 includes a housing 21, a rotor 22 affixed to a shaft 23, and a stator 24. Shaft 23 is coupled to the compressor shaft, either by a coupling 29 to provide a direct connection, or the connection can be made through a gear set (not shown). Housing 21 provides a hermetic seal around the motor, except for seal arrangements where the motor shaft 23 extends outwardly from the housing, a first inlet 25 for receiving the sub-cooled liquid refrigerant through line 26, to be retained within a shroud 39, and an outlet 27 which vents the lower portion of shroud 39, through a line 28, to the evaporator. Another line 30 passes some of the sub-cooled refrigerant through a seal 31 at the end of shaft 23, through a passage 32 within the shaft which connects with a corresponding passage 33 within the center of the rotor. From that point the rotor cooling passage extends radially outwardly through the portion 34 to a longitudinal or axial portion 35 along the length of the rotor. The stator cooling arrangement includes a first cooling passage 36 which entends radially inwardly and connects with a longitudinal or axial portion 37 for distributing the refrigerant along the length of the stator. This contrasts to the rotor arrangement in which the rotor or second cooling passage first extends longitudinally through the shaft 23 and then, through the corridor 33, axially through a portion of the rotor, and radially outwardly through the portion 34 and thence longitudinally or axially along the passage 35. To this point the general cooling arrangement is related to those used in the prior art, in that it has been known to divert a portion of the sub-cooled refrigerant and use it to cool the rotor and the stator in a hermetically sealed motor arrangement. However the novel and unobvious details of the rotor and stator passages which lend patentability to the present arrangement will now be described with connection with the FIGS. 2 and 3.

DETAILED DESCRIPTION OF THE INVENTION

Figure 1:
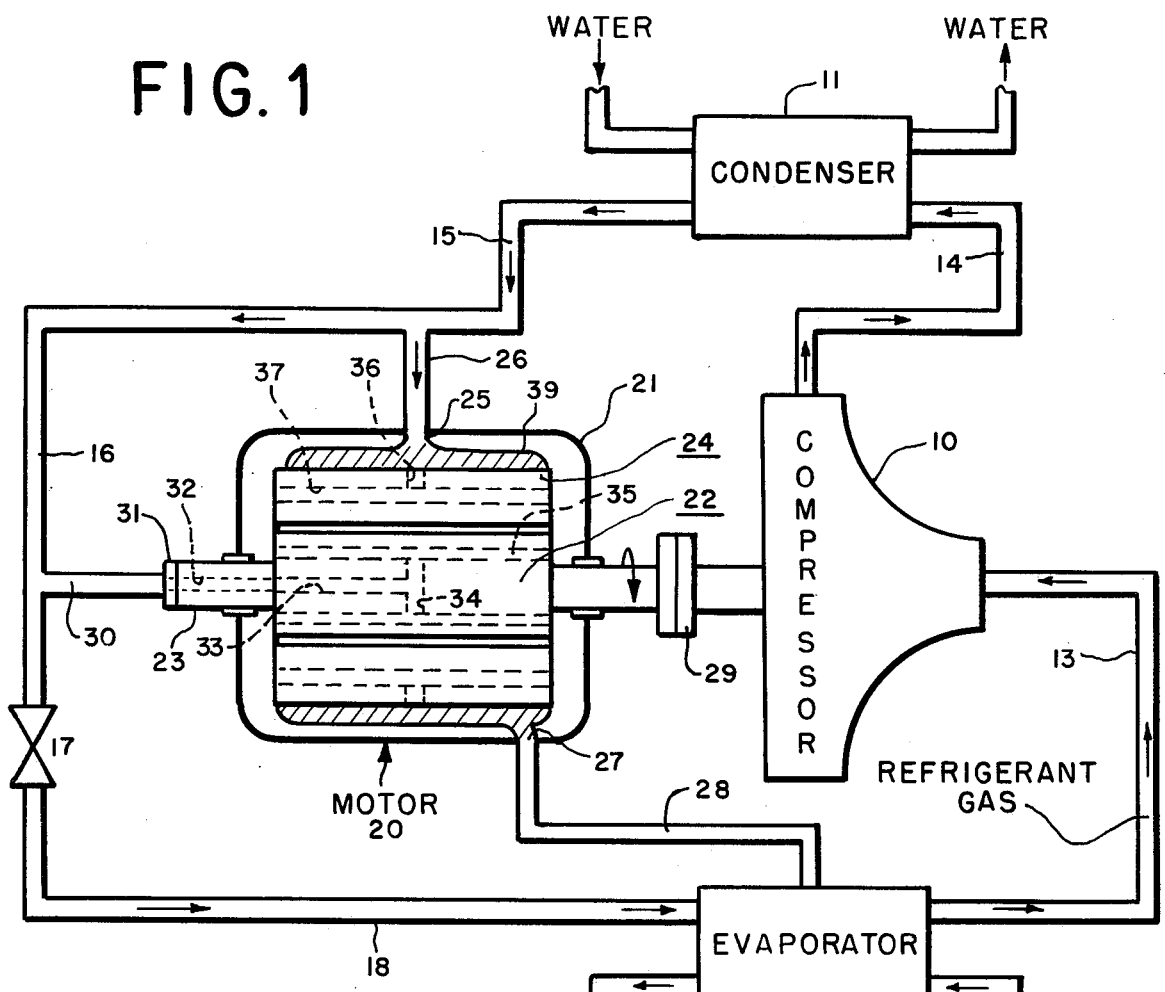
Figures 2, 3:
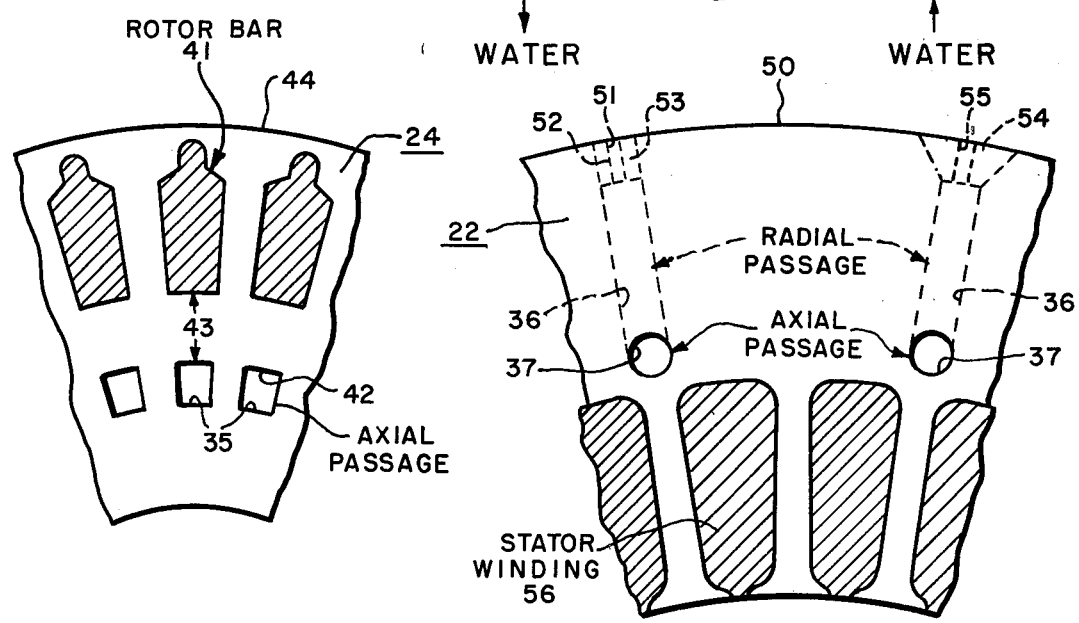

FIG. 2 is a detailed showing of a portion of the rotor 24, omitting the shaft which would abut the inner surface of the rotor. The section shows three of the rotor bars 41 which are provided by inserting conductive windings in the slots as shown. Particularly in accordance with the present invention, each of the rotor cooling passages 35, which extends longitudinally through the rotor, has its surface, such as 42, which is farthest removed from the center of the shaft curved in an arc which has as its center the center of rotor shaft 23. In this description the term "arc" means a portion of a complete circle. Thus any line drawn from the center line of the shaft or the rotor outwardly to terminate at surface 42 would be a true radius of the circle formed by drawing connecting arcs between all the outer surfaces 42.

In coming to the conclusion that the outer surface 42 should be a true arc, the motor and its operation were analyzed and it was found that the rotor and the film along arcuate surface 42 were subjected to very high gravitational (g) forces, of the order of 3,000 g's. Another significant consideration for the construction of the axial passage 35 is whether it should be aligned with each rotor bar 41, as shown in FIG. 2, or should be positioned between the rotor bars. Burn-out considerations were also important, to prevent the boiling off of the liquid on the surface 42 which would lead to significant degradation of the heat transfer, and thus substantial loss of the cooling effect. Burn-out is avoided by keeping the heat flux at the arcuate surface 42 at a value less than an experimentally determined value arrived at by considering the operating g level and the heat dissipation. Lastly it was important that the cross-sectional area of each passage 35 be considered to allow free passage of the generated vapor and thus avoid undue pressure drop as the liquid was vaporized, which would otherwise degrade the heat transfer.

The main solution to all these problems was to make the surface 42 of each axial passage 35 curved in an arc about the center of the rotor as described above. This militates against the pool boiling of the liquid at any one spot along the outer surface 42 of each passage 35, and contributes to avoiding burn-out along any portion of the passage. To consider the temperatures around the rotor bar 41, the rotor was designed with approximately the dimensions shown in the drawing, so that a temperature difference of no more than 45° F. (verified by finite element heat transfer calculations) would be developed between the film on surface 42 and the outer surface 44 of the rotor. The distance 43 between the cooling passage 35 and the rotor bar 41 was about ⅜ inch in the illustrated embodiment, and it was found that this distance should be in the range of ¼ to ⅜ inch. This is required to remove the heat from the conductive windings in the slot, and also to provide effective cooling at the outer surface 44 of the rotor. About fifty percent of the heat loss is in the rotor bars themselves, and the remainder occurs at the outer surface of the rotor. The axial cooling passages 35 were aligned with the individual rotor bars 41 because in the multi-stamp operation utilized to fabricate the rotor, this entailed minimum indexing and thus least manufacturing expense. The cross-sectional area of each passage 35 was important so that, as the liquid was evaporated, the net gas velocity along each passage would be sufficiently low and avoid an excess pressure drop. This prevents a restriction of the flow which would otherwise degrade the heat transfer. In the illustrative embodiment the axial passages 35 were about ¼ inch on each side, and this was found effective for good cooling and avoided restriction of the gas flow.

FIG. 3 shows a detail of a stator portion, taken in section in a manner similar to that of the rotor in FIG. 2. FIG. 3 illustrates two of the radial passage portions 36 and their connections with respect to longitudinal or axial portions 37. Particularly in accordance with the present invention, each radial passage 36 has some means for defining an orifice, shown in the area adjacent outer surface 50 of the stator. Orifice 51 shown in the left portion of FIG. 3 is defined by lamination segments 52,53, which leave a central orifice 51 extending downwardly in communication with the radial passage 36. This was done in the initial stator constructions to provide an orifice of approximately 0.050 inch. Any smaller size orifice would lead to contamination problems in the refrigerant. However to produce the construction shown for orifice 51, the need for short laminations and spacers added complexity to the assembly operation. Accordingly, it was decided to drill and tap a hole to insert a component such as member 54, which defines an orifice 55 of approximately 0.050 inch in communication with the radial passage 36. The drilling, tapping and screwing in of the member 54 proved more economical than the fabrication of the stator with the spacers and short, dummy laminations as shown at the left in connection with the orifice 51. Those skilled in the art will appreciate the axial passage constructions shown in FIG. 3 represent means for producing a pressure drop in the passage 36, which extends radially inwardly, which is higher than the pressure drop produced in the passage 37 which extends longitudinally in the stator.

It is also important to locate the axial passages 37 to minimize interference with the flux paths in the stator. It is noted that in the illustrative embodiment each of the passages 37 is located midway between two adjacent windings 56 in the stator. It was also found that there need be only one axial passage 37 for every two stator windings to provide effective cooling. With this arrangement, and by defining an orifice somewhere in the radial passage 36, the throttling element improves the heat transfer effectiveness by a factor of two, with a corresponding enhancement of the cooling ability of the indicated construction.

TECHNICAL ADVANTAGES

The illustrated arrangement of the cooling passages provides much better heat transfer, and thus substantially increased cooling effect for a liquid cooled hermetically sealed motor as described. Of particular importance are the curved surface 42 in the rotor axial passages, to effect an even distribution of the cooling liquid under the high g forces and to minimize the possibility of boil-off with consequent burn-out. In the stator the provision of an orifice in each radial passage produced a throttling effect which substantially enhanced the effectiveness of the heat transfer in this area. These two improvements taken together significantly increase the ability of the motor to be driven at a higher speed, or driven at the same speed and produce increased power output, without damage by over-heating the windings or the insulation in the motor.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A cooling system having a compressor, a condenser, and an evaporator, all connected in a closed refrigeration circuit, a hermetically sealed electric motor, having a rotor affixed to a shaft and having a stator, which shaft is mechanically coupled to the compressor, said stator defining a cooling passage having a first portion extending radially inwardly and a second portion extending longitudinally, means for diverting a portion of the refrigerant from said condenser to said cooling passage, and means for collecting the diverted refrigerant and returning it to the evaporator, characterized in that the first portion of the cooling passage which extends radially inwardly exhibits a pressure drop higher than the pressure drop in the second portion which extends longitudinally.

2. A cooling system as claimed in claim 1 in which means defining an orifice is provided in the first portion of the cooling passage which extends radially inwardly in the stator.

3. A cooling system as claimed in claim 1, in which the stator includes a plurality of longitudinally extending cooling passages, and a plurality of radially extending passages, each communicating with one of said longitudinally extending passages, and means, defining an orifice, positioned in each of said radially extending passages to develop a pressure drop in each radially extending passage greater than the pressure drop in its associated longitudinally extending passage.

4. A cooling system as claimed in claim 3, in which said stator includes a plurality of electrically conductive windings extending axially, and each of said radially extending passages is radially aligned between two adjacent ones of the conductive windings.

5. A cooling system as claimed in claim 4, in which there is one radially extending passage connected to one longitudinally extending passage for every two conductive windings.

6. A cooling system having a compressor, a condenser, and an evaporator, all connected in a closed refrigeration circuit, a hermetically sealed electric motor, having a rotor affixed to a shaft and having a stator, which shaft is mechanically coupled to the compressor, said stator defining a first cooling passage extending radially inwardly and then longitudinally, said shaft and rotor defining a second cooling passage extending longitudinally through the shaft, radially outwardly into the rotor and then longitudinally through the rotor, means for diverting a portion of the refrigerant from said condensor to both said first and second cooling passages, and means for collecting the diverted refrigerant and returning it to the evaporator, characterized in that the portion of the first cooling passage which extends radially inwardly in the stator exhibits a pressure drop higher than the pressure drop of the portion of the first cooling passage which extends longitudinally in the stator, and the portion of the second cooling passage which extends longitudinally through said rotor has its surface farthest removed from the shaft center curved in an arc which has as its center the center of the rotor shaft.

7. A cooling system having a compressor, a condenser, and an evaporator, all connected in a closed refrigeration circuit, a hermetically sealed electric motor, having a rotor affixed to a shaft and having a stator, which shaft is mechanically coupled to the compressor, said shaft and rotor defining a cooling passage extending longitudinally through the shaft, radially outwardly into the rotor and then longitudinally through the rotor, means for diverting a portion of the refrigerant from said condenser to said cooling passage, and means for collecting the diverted refrigerant and returning it to the evaporator, characterized in that the portion of the colling passage which extends longitudinally through said rotor has its surface farthest removed from the shaft center curved in an arc which has as its center the center of the rotor shaft.

8. A cooling system as claimed in claim 7, in which the rotor includes a plurality of cooling passages extending longitudinally and each of said plurality of passages has its surface farthest removed from the shaft center curved in an arc which has as its center the center of the rotor shaft.

9. A cooling system as claimed in claim 8, in which said rotor includes a plurality of electrically conductive bars extending axially, and each of said plurality of cooling passages is radially aligned with one of said bars.

10. A cooling system as claimed in claim 9, in which the radial distance between each cooling passage and the adjacent conductive bar is between 0.25 and 0.375 inch.

* * * * *